United States Patent
Saito

(10) Patent No.: US 9,019,805 B2
(45) Date of Patent: Apr. 28, 2015

(54) MULTILAYER OPTICAL RECORDING MEDIUM, DRIVE DEVICE, REPRODUCING AND RECORDING APPARATUS, AND INSPECTION METHOD FOR MULTILAYER OPTICAL RECORDING MEDIUM

(71) Applicant: Kabushiki Kaisha Toshiba, Tokyo (JP)

(72) Inventor: Masahiro Saito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/798,747

(22) Filed: Mar. 13, 2013

(65) Prior Publication Data

US 2013/0250743 A1    Sep. 26, 2013

(30) Foreign Application Priority Data

Mar. 22, 2012 (JP) ................. 2012-065618

(51) Int. Cl.
| | | |
|---|---|---|
| G11B 7/00 | (2006.01) | |
| G11B 7/24 | (2013.01) | |
| G11B 7/095 | (2006.01) | |
| G11B 7/24038 | (2013.01) | |
| G11B 7/007 | (2006.01) | |

(52) U.S. Cl.
CPC .......... *G11B 7/0956* (2013.01); *G11B 7/24038* (2013.01); *G11B 7/00736* (2013.01); *G11B 2007/0013* (2013.01)

(58) Field of Classification Search
CPC .. G11B 7/24038; G11B 7/0956; G11B 7/263; G11B 2007/0013; G11B 7/00736; G11B 7/0948

USPC .......................................... 360/131, 133, 135
See application file for complete search history.

(56) References Cited

U.S. PATENT DOCUMENTS

| | | | | |
|---|---|---|---|---|
| 6,456,584 | B1* | 9/2002 | Nagata et al. ............... | 369/275.2 |
| 8,279,723 | B2* | 10/2012 | Nakatani et al. ............ | 369/44.14 |
| 2009/0303856 | A1* | 12/2009 | Kadowaki et al. ............ | 369/103 |
| 2010/0061204 | A1* | 3/2010 | Nakatani ..................... | 369/47.15 |
| 2011/0188358 | A1* | 8/2011 | Takahashi et al. .......... | 369/44.26 |
| 2012/0201110 | A1* | 8/2012 | Inoue et al. ................. | 369/44.14 |

FOREIGN PATENT DOCUMENTS

| | | |
|---|---|---|
| JP | 2002-50053 | 2/2002 |
| JP | 2003-99965 A | 4/2003 |
| JP | 2004-280987 A | 10/2004 |
| JP | 2006-18884 | 1/2006 |
| JP | 2006-99844 A | 4/2006 |

(Continued)

*Primary Examiner* — Wayne Young
*Assistant Examiner* — Dionne Pendleton
(74) *Attorney, Agent, or Firm* — Oblon, McClelland, Maier & Neustadt, L.L.P.

(57) ABSTRACT

According to one embodiment, a multilayer optical recording medium including a substrate, a guide layer group that is provided on the substrate and has guide layers in which positional information in a radial direction is recorded, and a recording layer group that is provided on the substrate and has recording layers in which information can be recorded. In the recording layer group, positional information of the recording layers associated with the positional information recorded in the guide layers and control information of the optical device where reflected light volumes of the laser beams on the guide layers and the recording layers become maximum at the positions in the radial direction are recorded at the positions in the radial direction of the recording layers.

7 Claims, 5 Drawing Sheets

(56) References Cited

FOREIGN PATENT DOCUMENTS

| JP | 2006-331546 A | 12/2006 |
| JP | 2008-159203 | 7/2008 |
| JP | 2011-90745 A | 5/2011 |

* cited by examiner

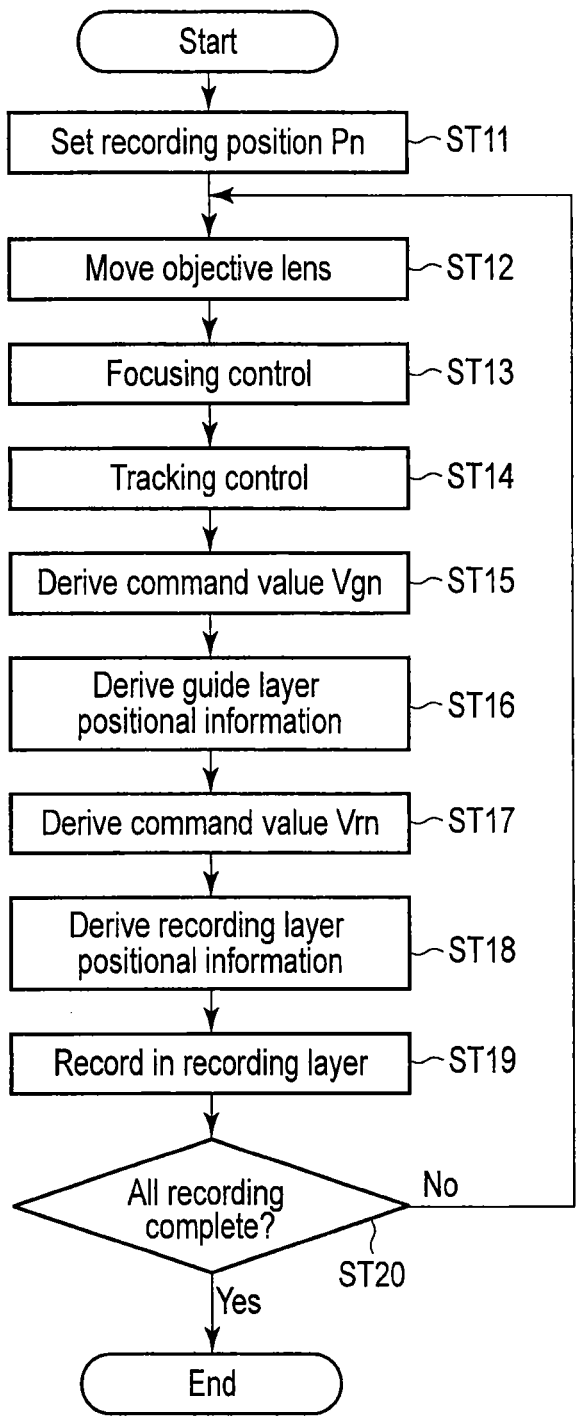
F I G. 5

US 9,019,805 B2

MULTILAYER OPTICAL RECORDING MEDIUM, DRIVE DEVICE, REPRODUCING AND RECORDING APPARATUS, AND INSPECTION METHOD FOR MULTILAYER OPTICAL RECORDING MEDIUM

CROSS-REFERENCE TO RELATED APPLICATIONS

This application is based upon and claims the benefit of priority from Japanese Patent Application No. 2012-065618, filed Mar. 22, 2012, the entire contents of which are incorporated herein by reference.

FIELD

Embodiments described herein relate generally to a multilayer optical recording medium, a drive device, and an inspection method for an optical recording medium.

BACKGROUND

As optical recording media, optical disks such as a Digital Versatile Discs (DVDs) and Blu-ray Discs (BDs) are conventionally known. Such optical recording media are formed to enable reproduction of information or both reproduction and recording of information. In regard to the optical recording media, there is known a technology that enhances recording density in a recording layer through realization of short laser wavelength, high objective lens numerical aperture, use of a recording medium material suitable for high-density recording, countermeasures against noise in reproduction signal processing, and other features.

Further, as a technology that enhances the recording density, there is known a multilayer optical recording medium in which multiple guide layers and multiple recording layers are provided or a drive device that performs, for example, recording or reproduction using this multilayer optical recording medium.

However, the multilayer optical recording medium may be warped by internal stress due to an environmental change such as a temperature and humidity or age deterioration in some cases. When warpage occurs, functions of the multilayer optical recording medium may possibly be lost and, for example, a non-recorded region may be generated or a recorded region may be overwritten.

BRIEF DESCRIPTION OF THE DRAWINGS

FIG. 5 is a flowchart showing an example of a recording method with respect to the multilayer optical recording medium using the drive device.

DETAILED DESCRIPTION

In general, according to one embodiment, a multilayer optical recording medium comprises: a substrate; a guide layer group that is provided on the substrate and has one or more guide layers in which positional information in a radial direction is recorded and which reflect a laser beam emitted from an optical device; and a recording layer group that is provided on the substrate and has recording layers in which information can be recorded and which reflect a laser beam emitted from the optical device. In the recording layer group, positional information of the recording layers associated with the positional information recorded in the guide layers and control information of the optical device where reflected light volumes of the laser beams on the guide layers and the recording layers become maximum at the positions in the radial direction are recorded at the positions in the radial direction of the recording layers.

A multilayer optical recording medium 100, a drive device 1, and an inspection method of the multilayer optical recording medium 100 according to this embodiment will now be described with reference to FIG. 1 to FIG. 6.

Figure 1:
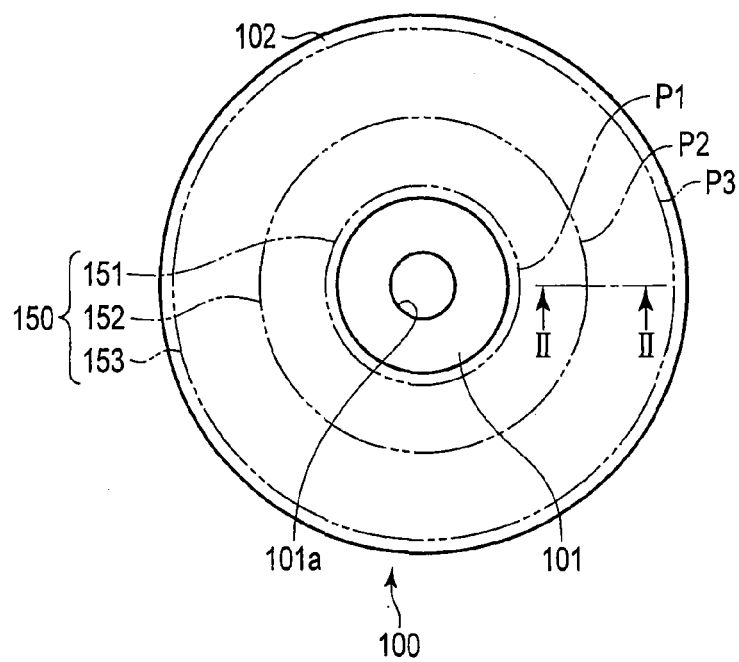
FIG. 1 is a plan view showing a configuration of a multilayer optical recording medium according to an embodiment.
Figure 2:
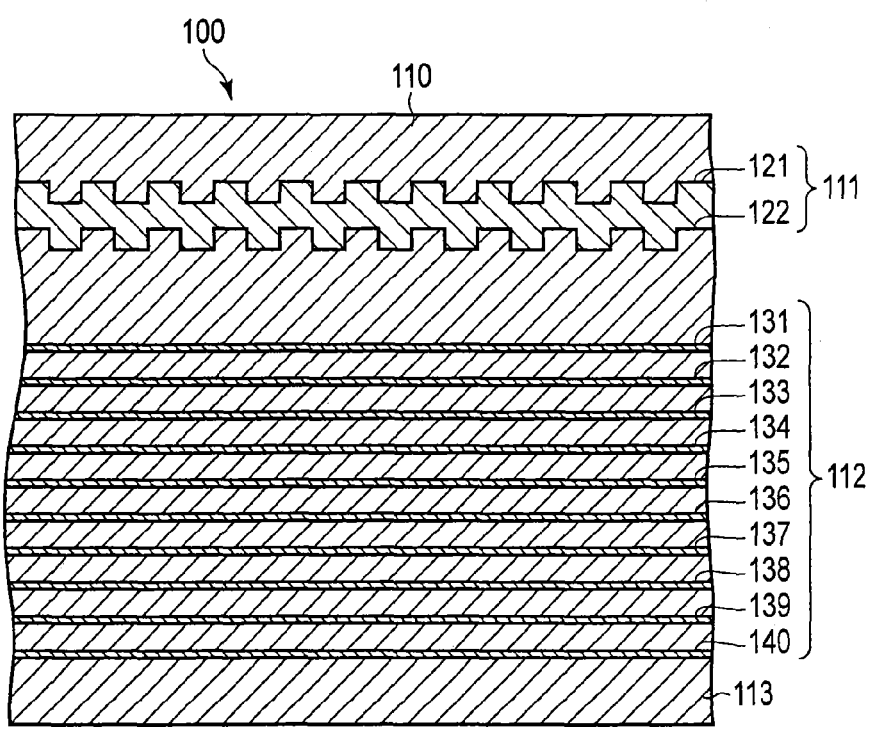
FIG. 2 is a cross-sectional view showing a primary configuration of the multilayer optical recording medium.
Figure 3:
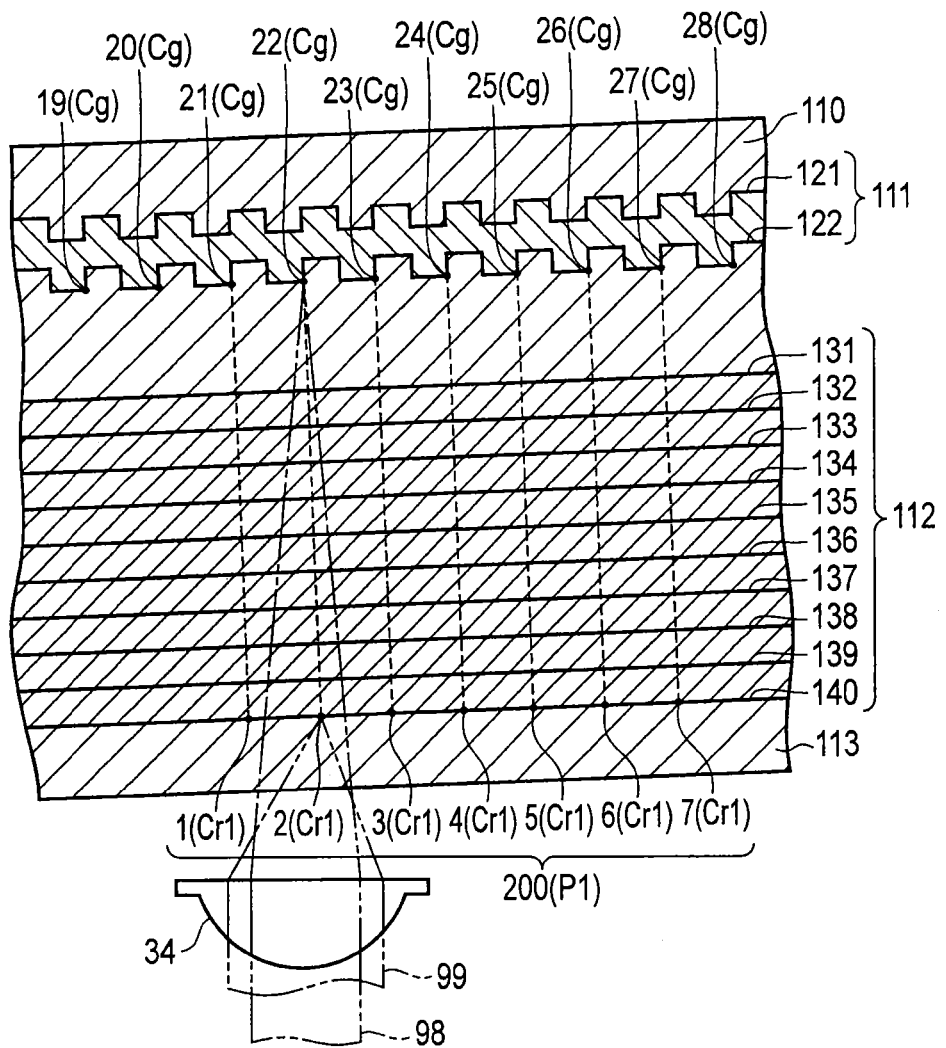
FIG. 3 is a cross-sectional view schematically showing an example of the primary configuration of the multilayer optical recording medium.
Figure 4:
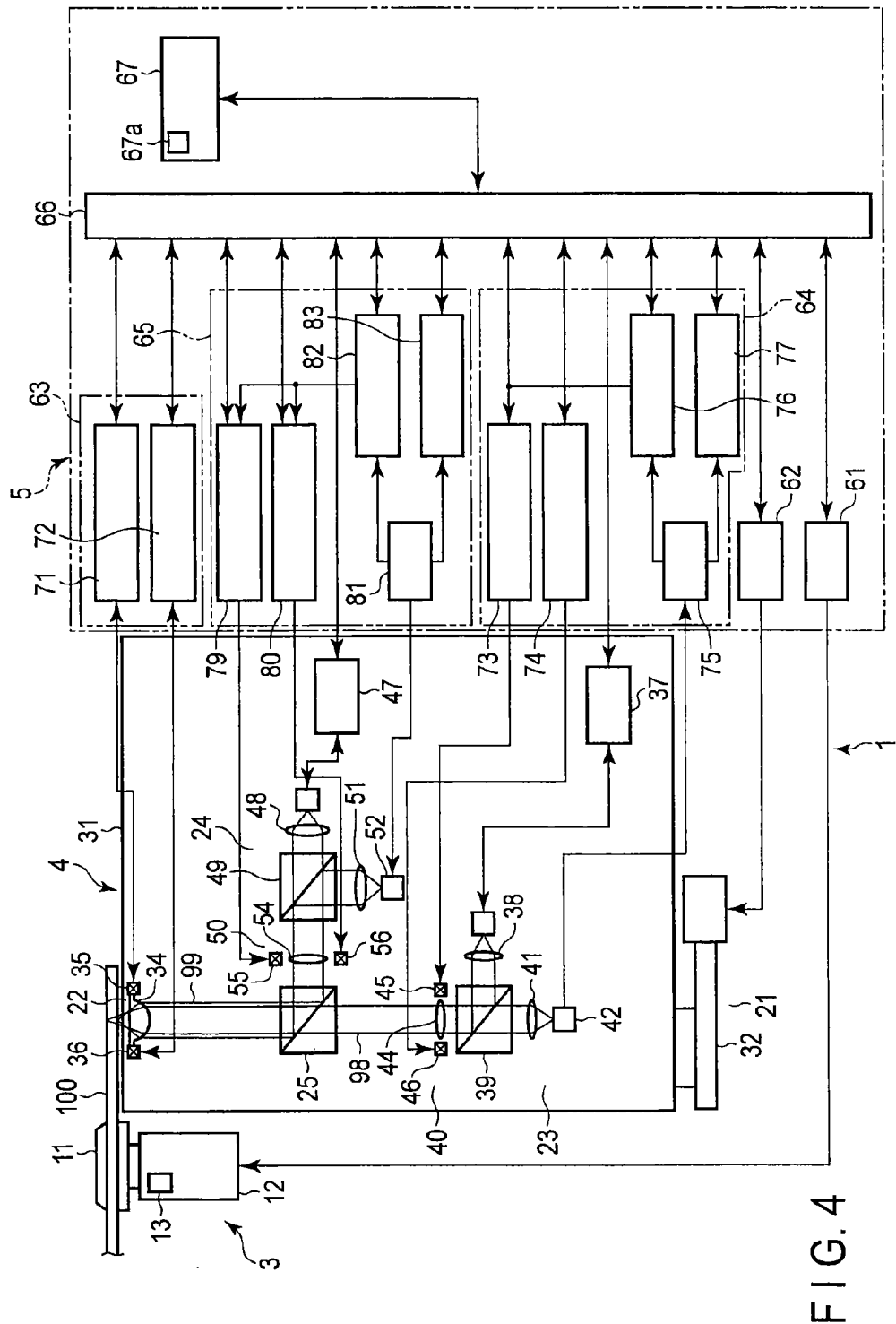
FIG. 4 is an explanatory view showing a configuration of a drive device used for the multilayer optical recording medium.
Figure 6:
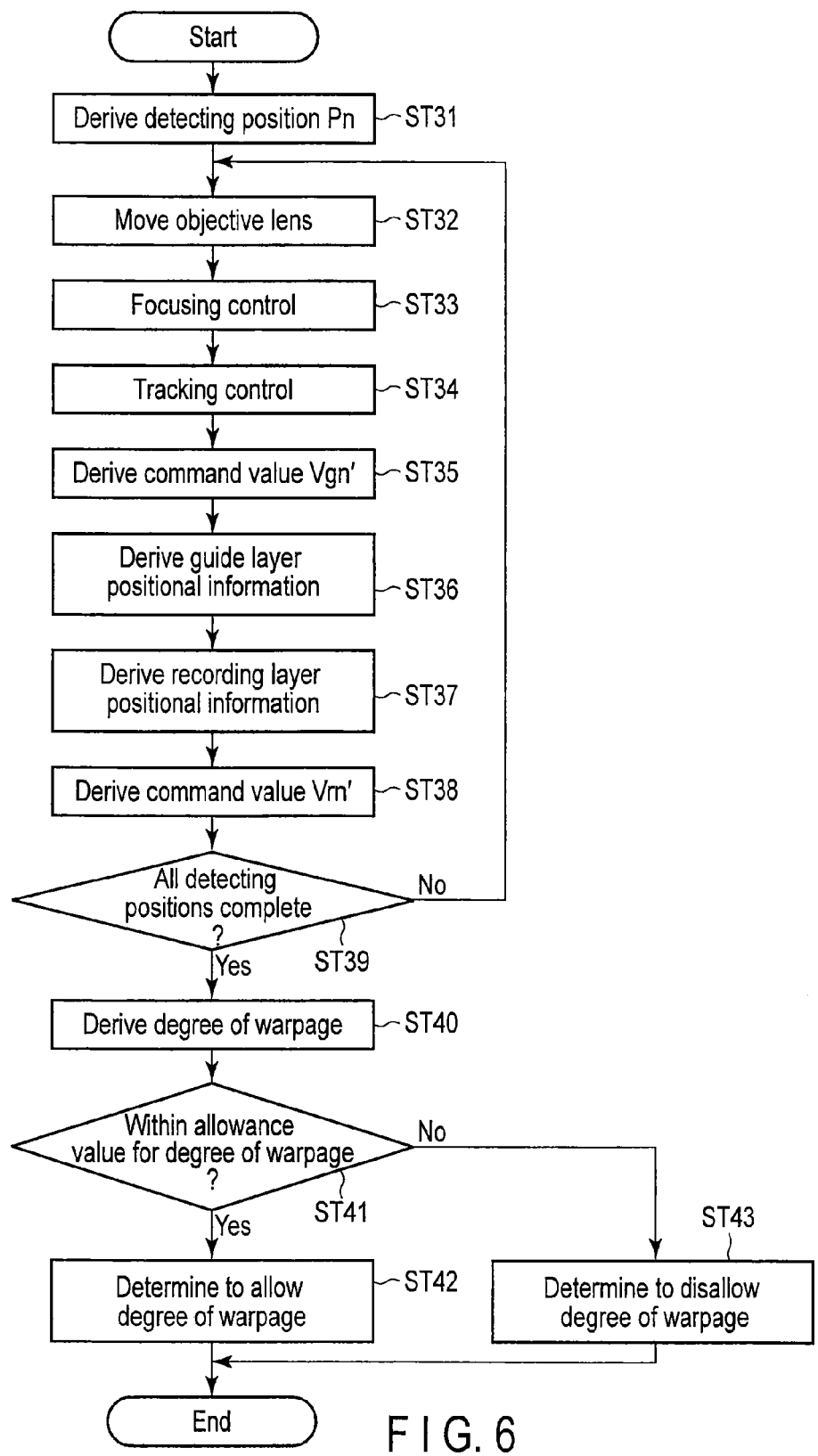
FIG. 6 is a flowchart showing an example of a detection method for a degree of warpage of the multilayer optical recording medium using the drive device.

FIG. 1 is a plan view showing a configuration of the multilayer optical recording medium 100 according to an embodiment, FIG. 2 is a cross-sectional view showing a primary configuration of the multilayer optical recording medium 100 which is specifically a cross section taken along line II-II in FIG. 1 showing configurations of a guide layer group 111 and a recording layer group 112, FIG. 3 is a cross-sectional view schematically showing a primary configuration of the multilayer optical recording medium 100 which is specifically an example of a sign Cg1 and a sign Cr1 of a second guide layer 122 and a tenth recording layer 140 at a position P1 of the multilayer optical recording medium 100, FIG. 4 is an explanatory view showing a configuration of the drive device 1 used for the multilayer optical recording medium 100, FIG. 5 is a flowchart showing an example of a recording method for the multilayer optical recording medium 100 using the drive device 1, and FIG. 6 is a flowchart showing an example of a detection method for a degree of warpage of the multilayer optical recording medium using the drive device 1.

(Multilayer Optical Recording Medium 100)

The multilayer optical recording medium 100 is formed to enable recording and reproduction of information by using the drive device 1 or the like. As shown in FIG. 1, the multilayer optical recording medium 100 is formed into a discoid shape. The multilayer optical recording medium 100 has a clamp portion 101 which is a support region fixed to the drive device 1 or the like at the center thereof and a recording region 102 in which information is recorded. The clamp portion 101 has a hole portion 101a formed at the center thereof.

As shown in FIG. 2, the multilayer optical recording medium 100 comprises a substrate 110, a guide layer group 111, a recording layer group 112, and a cover layer 113. In the multilayer optical recording medium 100, the guide layer group 111, the recording layer group 112, and the cover layer 113 are sequentially provided on the substrate 110.

The substrate 110 is made of a resin material such as polycarbonate and has the clamp portion 101 at the center thereof. The substrate 110 is formed to be capable of supporting the guide layer group 111, the recording layer group 112, and the cover layer 113 in the recording region 102.

The guide layer group 111 is provided on the substrate 110 and constituted of guide layers that perform positioning of a later-described optical device 4 of the drive device 1 in a radial direction. It should be noted that the radial direction is a radial direction of the multilayer recording medium 100.

Each guide layer in the guide layer group 111 is formed into, for example, a concentric or helical groove structure and has a column with light reflection involving diffracted light.

Specifically, as shown in FIG. 2, the guide layer group 111 comprises a first guide layer 121 and a second guide layer 122 from the substrate 110 side.

Each of the first guide layer 121 and the second guide layer 122 has a groove structure in which lands as concave portions and grooves as convex portions are formed. In the first guide layer 121 and the second guide layer 122, information of track positions where the optical device 4 is positioned is recorded.

The track positions are, for example, track numbers or the like each indicating a position of a track of the multilayer optical recording medium 100. In the first guide layer 121 and the second guide layer 122, signs Cg as information of the track positions are recorded.

The recording layer group is constituted of recording layers that can record information. For example, the recording layer group 112 comprises a first recording layer 131, a second recording layer 132, a third recording layer 133, a fourth recording layer 134, a fifth recording layer 135, a sixth recording layer 136, a seventh recording layer 137, an eighth recording layer 138, a ninth recording layer 139, and a tenth recording layer 140 from the substrate 110 side.

For example, a position in the radial direction of each of the first recording layer 131, the third recording layer 133, the fifth recording layer 135, the seventh recording layer 137, and the ninth recording layer 139 is determined based on information of a track position in the first guide layer 121. Furthermore, for example, a position in the radial direction of each of the second recording layer 132, the fourth recording layer 134, the sixth recording layer 136, the eighth recording layer 138, and the tenth recording layer 140 is determined based on information of a track position in the second guide layer 122.

Moreover, in part of the recording layer group 112, track information 150 is recorded by the later-described drive device 1. The cover layer 113 is made of a light transmissive material and protects the recording layer group 1120.

The track information 150 is information of tracks on the multilayer recording medium 100 which are provided at arbitrary positions P1 to Pn in positions (n positions) in the radial direction of the multilayer optical recording medium 100 in any one of the first recording layer 131 to the tenth recording layer 140 in the recording layer group 112. The track information 150 includes first track information 151 to nth track information provided at arbitrary positions Pl to Pn.

For example, as shown in FIG. 1, the track information 150 is recorded in the tenth recording layer 140, and first track information 151 to third track information 153 are provided at three arbitrary positions P1 to P3 (n=3) in the radial direction of the multilayer optical recording medium 100, respectively.

Further, arbitrary positions P1 to P3 (positions Pn) may be positions arbitrarily input from the outside or may be positions preset in the multilayer optical recording medium 100 or the drive device 1.

For example, arbitrary positions P1 to P3 in the tenth recording layer 140 where the track information 150 is provided are set at three positions, for example, a position close to the clamp portion 101 of the substrate 110, a position close to an outer peripheral edge of the substrate 110, and an intermediate position between the position close to the clamp portion 101 and the position close to the outer peripheral edge of the substrate 110 as shown in FIG. 1.

In this embodiment, position P1, position P2, and position P3 are provided from the clamp portion 101 side toward the outer peripheral edge side of the substrate 110. Furthermore, the first track information 151, the second track information 152, and the third track information 153 are provided at position P1 to position P3, respectively.

As the first track information 151 to the third track information 153, positional information of the recording layer group 112 based on track positions in either the first guide layer 121 or the second guide layer 122 in a predetermined range of the respective arbitrary positions P1 to P3 is recorded.

In this embodiment, since a configuration where the track information 150 is recorded in the tenth recording layer 140 is described, the first track information 151 to the third track information 153 are provided in the tenth recording layer 140 based on the information of the track positions in the second guide layer 122.

Each of the first track information 151 to the third track information 153 is constituted by recording sign Cr of the tenth recording layer 140 associated with sign Cg in a predetermined range of the second guide layer 122 at each of arbitrary positions P1 to P3 is recorded in the tenth recording layer 140. Sign Cr includes a sign Cr1 that is recorded in the first track information 151 and associated with sign Cg at position P1, a sign Cr2 which is recorded in the second track information and associated with sign Cg at position P2, and a sign Cr which is recorded in the third track information 153 and associated with sign Cg at position P3.

Giving a description on an example shown in FIG. 3, for example, it is assumed that signs Cg are provided with 21 to 27 in the second guide layer 122 in a predetermined region 200 at arbitrary position P1 as track position information. In this case, as the first track information 151, 1 to 7, each of which is an integer of a last digit of sign Cg, are recorded as signs Cr1 associated with 21 to 27 of signs Cg. In this manner, the first track information 151 to the third track information 153 can be obtained by deriving signs Cr which are uniquely derived from signs Cg of the second guide layer 122 in the predetermined range at the respective positions P1 to P3.

Moreover, as the track information 150, at arbitrary positions P1 to P3, a command value Vg for tracking control that maximizes a reflected light volume of a laser beam 98 in the second guide layer 122 and a command value Vr for tracking control that maximizes a reflected light volume of a laser beam 99 in the tenth recording layer 140 are recorded, respectively.

It should be noted that command values Vg and Vr are commands that allow the optical device 4 to perform the tracking control of the second guide layer 122 and the tracking control of the tenth recording layer 140 by using the control device 5 in the later-described drive device 1. Command values Vg and Vr are, for example, digital signals indicative of voltages or the like, and particulars thereof can be appropriately set in accordance with a configuration of the drive device 1.

(Drive Device 1)

The drive device 1 is formed as a drive for the multilayer optical recording medium 100 to enable recording of information in the multilayer recording medium 100 and reproduction of information recorded in the multilayer optical recording medium 100. The drive device 1 constitutes a reproducing and recording apparatus.

As shown in FIG. 4, the drive device 1 comprises a spindle device 3 that rotates the multilayer optical recording medium 100, the optical device 4 that can emit a laser beam, and a control device 5 that controls the spindle device 3 and the optical device 4.

The spindle device 3 comprises a disk clamp 11, a spindle motor 12, and a rotary encoder 13. The disk clamp 11 is configured to support the multilayer optical recording medium 100 when it is fitted in the hole portion 101a of the clamp portion 101 of the multiplayer optical recording medium 100. The rotary encoder 13 is configured to detect a rotation angle and the number of revolutions of the spindle motor 12.

The optical device 4 comprises a feed device 21, an objective lens device (a lens device) 22, a guide layer optical device 23 that can emit the laser beam 98, a recording layer optical device 23 that can emit the laser beam 99, and a dichroic mirror (DM) 25.

The feed device 21 comprises: a support body 31 which is configured to support the objective lens device 22, the guide layer optical device 23, the recording layer optical device 24, and the DM 25; and a feed motor 32 which is driving means for moving the support body 31 in the radial direction of the multilayer optical recording medium 100 supported by the disk clump 11.

The objective lens device 22 comprises an objective lens 34 that is configured to converge the laser beams 98 and 99 emitted from the guide layer optical device 23 and the recording layer optical device 24, a first actuator 35 that adjusts focus of the laser beams 98 and 99 that pass through the objective lens 34, and a second actuator 36 that adjusts positions in the radial direction irradiated with the laser beams 98 and 99 that pass through the objective lens 34.

The objective lens 34 is arranged to face a cover layer 113 of the multilayer optical recording medium 100 supported by the disk clamp 11. The objective lens 34 allows the supplied laser beams 98 and 99 to exit therefrom along the same optical axis.

The first actuator 35 is configured to drive the objective lens 34 and thereby enable so-called focusing for adjusting convergence of the laser beams 98 and 99 effected by the objective lens 34. The first actuator 35 irradiates arbitrary layers in the guide layer group 111 and the recording layer group 112 with the laser beams 98 and 99 by driving the objective lens 34.

The second actuator 36 is configured to enable so-called tracking for adjusting a position of the objective lens 34 in the radial direction by driving the objective lens 34. The second actuator 36 adjusts positions irradiated with the laser beams 98 and 99 in the radial direction by driving the objective lens 34.

The guide layer optical device 23 comprises a guide layer light source 37, a collimator lens 38, a polarization beam splitter (PBS) 39, a guide layer lens device (a lens device) 40, a condensing lens 41, and a light receiving element 42. The guide layer optical device 23 is configured to supply the laser beam 98 to any layer in the guide layer group 111 and receive the laser beam 98 reflected from any layer in the guide layer group 111.

The guide layer light source 37 is a supply source of the laser beam 98 which has a transmitting element and is configured to emit the laser beam 98 from the transmitting element. The laser beam 98 emitted from the guide laser light source 37 is formed with a wavelength longer than that of the laser beam 99 emitted from the recording layer light source 47. The laser beam 98 is, for example, a red laser beam. The collimator lens 38 is formed to convert the laser beam 98 emitted from the guide layer light source 37 into parallel light.

The PBS 39 is configured to reflect or transmit the laser beam 98. The PBS 39 is configured to supply the laser beam 98, which is the parallel light converted by the collimator lens 38, to the DM 25 as it is. Further, the PBS 39 is configured to supply the laser beam 98, which is the parallel light supplied from the DM 25, to the condensing lens 41.

The guide layer lens device 40 is configured to perform focusing and tracking of the laser beam 98 traveling between the PBS 39 and the DM 25. The guide layer lens device 40 comprises a guide layer lens 44 that allows the laser beam 98 which is the parallel light supplied from the PBS 39 or the DM 25 to pass therethrough, a third actuator 45 that performs focusing of the guide layer lens 44, and a fourth actuator 46 that carries out tracking of the guide layer lens 44.

The focusing lens 41 converges the laser beam 98 which is the parallel light supplied from the DM 25 through the guide layer lens device 40 and the PBS 39 and allows the converged light to exit therefrom.

The light receiving element 42 receives the laser beam 98 converged by the condensing lens 41 and converts information recorded in any layer in the guide layer group 111 into a signal based on the received laser beam 98.

The recording layer optical device 24 comprises a recording layer optical source 47, a collimator lens 48, a polarization beam splitter (PBS) 49, a recording layer lens device (a lens device) 50, a condensing lens 51, and a light receiving element 52. The recording layer optical device 24 is configured to supply the laser beam 99 to any layer in the recording layer group 112 and receive the laser beam 99 reflected from any layer in the recording layer group 112.

The recording layer light source 47 is a supply source of the laser beam 99 which has a transmitting element and is configured to emit the laser beam 99 from the transmitting element. Moreover, the recording layer light source 47 is configured to emit the laser beam with an output value that differs depending on reproduction of information recorded in any layer in the guide layer group 111 and recording of information into any layer in the recording layer group 112. It should be noted that laser beam 99 at the time of reproduction has an output value lower than that of laser beam 99 at the time of recording.

A wavelength of laser beam 99 emitted from the recording layer light source 47 is formed shorter than that of laser beam 98 emitted from the guide layer light source 37. The laser beam 99 is, for example, a blue laser. The collimator lens 48 is configured to convert the laser beam 99 emitted from the recording layer light source 47 into parallel light.

The PBS 49 is configured to reflect or transmit the laser beam 99. The PBS 49 is configured to supply the laser beam 99, which is the parallel light converted by the collimator lens 48, to the DM 25 as it is. Additionally, the PBS 49 is configured to supply the laser beam 99, which is the parallel light supplied from the DM 25, to the condensing lens 51.

The recording layer lens device 50 is configured to perform focusing and tracking of the laser beam 99 traveling between the PBS 49 and the DM 25. The recording layer lens device 50 comprises a recording layer lens 54 that allows the laser beam 99 which is the parallel light supplied from the PBS 49 or the DM 25 to pass therethrough, a fifth actuator 55 that performs focusing of the recording layer lens 54, and a sixth actuator 56 which carries out tracking of the recording layer lens 54.

The condensing lens 51 converges the laser beam 99 which is the parallel light supplied from the DM 25 through the recording layer lens device 50 and the PBS 49, and allows the converged light to exit to the light receiving element 52.

The light receiving element 52 receives the laser beam 99 converged by the condensing lens 51 and converts information recorded in any layer in the recording layer group 112 into a signal based on the received laser beam 99.

The DM 25 is configured to supply the laser beams 98 and 99, which are supplied from the guide layer optical device 23 and the recording layer optical device 24, to the objective lens 34 and reflect and transmit the laser beams 98 and 99. Furthermore, the DM 25 is configured to supply the laser beams 98 and 99 reflected by the multilayer optical recording medium 100 to the guide layer optical device 23 and the recording layer optical device 24.

The control device 5 comprises a spindle motor control unit 61, a feed motor control unit 62, an objective lens control unit 63, a guide layer control unit 64, a recording layer control unit 65, a signal bus 66, and a main control unit 67.

The spindle motor control unit 61 is connected to the spindle motor 12 and the rotary encoder 13 and configured to control the number of revolutions of the multilayer optical recording medium 100 supported on the disk clump 11 by controlling drive of the spindle motor 12.

The feed motor control unit 62 is connected to the feed motor 32 and configured to control a traveling length of the objective lens 34 supported on the support body 31 by controlling drive of the feed motor 32.

The objective lens control unit 63 comprises a first control unit 71 that controls the first actuator 35 and a second control unit 72 that controls the second actuator 36. The first control unit 71 is configured to control focusing of the objective lens 34 by controlling the first actuator 35. The second control unit 72 is configured to control tracking of the objective lens 34 by controlling the second actuator 36.

The guide layer control unit 64 comprises a third control unit 73 that controls the third actuator 45, a fourth control unit 74 that controls the fourth actuator 46, a guide layer radio frequency amplifier (an RF amplifier) 75, a guide layer error signal generation unit 76, and a guide layer reproduction signal generation unit 77.

The third control unit 73 is configured to control focusing of the guide layer lens 44 by controlling the third actuator 45. The fourth control unit 74 is configured to control tracking of the guide layer lens 44 by controlling the fourth actuator 46. The guide layer RF amplifier 75 is configured to amplify the signal of the laser beam 98 converted by the light receiving element 42.

The guide layer error signal generation unit 76 is connected to the third control unit 73, the fourth control unit 74, and the guide layer RF amplifier 75 and configured to generate an error signal from information of the laser beam 98 received by the light receiving element 42 when error information is included in this information. The guide layer reproduction signal generation unit 77 is configured to generate a reproduction signal, which is used for reproducing information, from the information of the laser beam 98 received by the light receiving element 42. It should be noted that the guide layer reproduction signal generation unit 77 does not generate the reproduction signal when the information of the laser beam 98 is the error information.

The recording layer control unit 65 comprises a fifth control unit 79 that controls the fifth actuator 55, a sixth control unit 80 that controls the sixth actuator 56, a recording layer radio-frequency (RF) amplifier 81, a recording layer error signal generation unit 82, and a recording layer reproduction signal generation unit 83.

The fifth control unit 79 is configured to control focusing of the recording layer lens 54 by controlling the fifth actuator 55. The sixth control unit 80 is configured to control tracking of the recording layer lens 54 by controlling the sixth actuator 56. The recording layer RF amplifier 81 is configured to amplify the information of the laser beam 99 converted by the light receiving element 52.

The recording layer error signal generation unit 82 is connected to the fifth control unit 79, the sixth control unit 80, the recording layer RF amplifier 81. The recording layer error signal generation unit 82 is configured to generate an error signal from the information of the laser beam 99 received by the light receiving element 52 when error information is included in this information. The recording layer reproduction signal generation unit 83 is configured to generate a reproduction signal from the information of the laser beam 99 received by the light receiving element 52. It should be noted that the recording layer reproduction signal generation unit 83 does not generate the reproduction signal when the information of the laser beam 99 is error information.

The signal bus 66 is configured to connect the spindle motor control unit 61, the feed motor control unit 62, the main control unit 67, the first control unit 71, the second control unit 72, the third control unit 73, the fourth control unit 74, the guide layer error signal generation unit 76, the guide layer reproduction signal generation unit 77, the fifth control unit 79, the sixth control unit 80, the recording layer error signal generation unit 82, and the recording layer reproduction signal generation unit 83.

The main control unit 67 controls the spindle motor control unit 61, the feed motor control unit 62, the first control unit 71, the second control unit 72, the third control unit 73, the fourth control unit 74, the guide layer error signal generation unit 76, the guide layer reproduction signal generation unit 77, the fifth control unit 79, the sixth control unit 80, the recording layer error signal generation unit 82, and the recording layer reproduction signal generation unit 83 connected through the signal bus 66.

Specifically, the main control unit 67 rotates the multilayer optical recording medium 100 at a predetermined number of revolutions by controlling the spindle motor control unit 61 and the feed motor control unit 62, and moves the objective lens 34 to a position at which recording or reproduction of the multilayer optical recording medium 100 is performed.

The main control unit 67 controls exit and stop of the laser beams 98 and 99 by controlling the guide layer light source 37 and the recording layer light source 47.

The main control unit 67 controls the first control unit 71, the second control unit 72, the third control unit 73, the fourth control unit 74, the fifth control unit 79, and the sixth control unit 80 based on a command from the outside and the signals received from the guide layer error signal generation unit 76, the guide layer reproduction signal generation unit 77, the recording layer error signal generation unit 82, and the recording layer reproduction signal generation unit 83, thereby effecting focusing and tracking of the laser beams 98 and 99.

Additionally, the main control unit 67 has a memory unit 67*a* that stores a threshold value D which is information of a degree of warpage of the multilayer optical recording medium 100, the memory unit 67*a* being capable of storing the information of the multilayer optical recording medium 100 received by the light receiving elements 42 and 52 and maintaining a function of the multilayer optical recording medium 100. It should be noted that the function of the multilayer optical recording medium 100 is, for example, a function for reproducing and recording information, and a range of a degree of warpage that can allow such a function is set as the threshold value D. The main control unit 67 has the following functions (1) to (4).

(1) A function of recording the track information 150 in any layer in the recording layer group 112 of the multilayer optical recording medium 100.

(2) A function of calibrating the objective lens 34 at any one of the arbitrary positions P1 to Pn.

(3) A function of measuring a degree of warpage of the multilayer optical recording medium 100 at each of the arbitrary positions P1 to Pn.

(4) A function of determining a state of the multilayer optical recording medium 100 from the recorded track information 150 and the measured degree of warpage of the multilayer optical recording medium 100.

These functions (1) to (4) will now be described.

The function (1) is configured to receive information of the sign Cg of the second guide layer 122 and derive the sign Cr which is the information of the track position in the tenth recording layer 140 uniquely derived from the sign Cg. Further, signs Cr1 to Crn which are information of track positions in the tenth recording layer 140 in a predetermined region of the arbitrary positions P1 to Pn are derived from the signs Cg in the predetermined region of the arbitrary positions P1 to Pn in the second guide layer 122. This is a function of recording the derived signs Cr1 to Crn in the predetermined region of the positions P1 to Pn with respect to the first track information 151 to the nth track information.

Furthermore, the function (1) acquires control information of the guide layer optical device 23 and the recording layer optical device 24 that maximize reflected light volumes of the laser beams 98 and 99 from the signs Cg and the signs Cr1 to the sign Cr at the arbitrary positions P1 to Pn as the track information 150.

That is, as the control information, this function derives a command value Vg1 to a command value Vgn of the second guide layer and a command value Vr1 to a command value Vrn of the tenth recording layer 140 as command values that maximize the reflected light volumes at the predetermined positions P1 to Pn. The function (1) is a function of recording the derived command values Vg1 to Vgn of the second guide layer 122 and the derived command values Vr1 to Vrn of the tenth recording layer 140 into the first track information 151 to the nth track information at the respective predetermined positions P1 to Pn.

The function (2) is a function of obtaining a command value Vg1' of the second guide layer 122 and a command value Vr1' of the tenth recording layer 140 obtained by calibrating an inclination (tilt inclination) of the disk clamp 11 in a tilt direction based on irradiation positions of the laser beams 98 and 99 at the arbitrary position Pn, for example, the arbitrary position Pn provided on the innermost side of the multilayer optical recording medium 100 where a degree of warpage is minimum.

Specifically, a position of the sign Cg1 and the sign Cr1 of the first track information 151 recorded in the multilayer optical recording medium 100 is irradiated with the laser beams 98 and 99, respectively, and the command value Vg1' and the command value Vr1' that maximize the reflected light volumes of the laser beams 98 and 99 are obtained.

Since the multilayer optical recording medium 100 has the minimum degree of warpage at the position P1, when the degree of warpage is defined as substantially zero, a difference between each of the command value Vg1 and the command value Vr1 recorded in the first track information 151 at the position P1 and each of the newly obtained command values Vg1' and Vr1' is a tilt inclination of the disk clamp 1. Therefore, each of the command value Vg1' and the command value Vr1' is a calibration value obtained by calibrating the tilt inclination.

The function (2) is a function that determines each of the derived command values Vg1' and Vr1' as each of the command values Vg1' and Vr1' considering the tilt inclination of the multilayer optical recording medium 100 supported by the disk clamp 11 and sets each determined value as a reference value obtained by calibrating the tilt inclination. It should be noted that the obtained command values Vg1' and Vr1' are stored in the memory unit 67a.

The function (3) is a function of obtaining a command value Vg2' to a command value Vgn' of the second guide layer 122 and a command value Vr2' to a command value Vgn' of the tenth recording layer 144 at the arbitrary positions P2 to Pn and obtaining a degree of warpage ΔVg' of the second guide layer 122 from a difference between the command value Vg1' at the position P1 and each of the command values Vg2' to the command value Vgn' acquired at the other arbitrary positions P2 to Pn. Similarly, the function (3) is a function of obtaining a degree of warpage ΔVrn' of the tenth recording layer 140 at each position Pn from a difference between the command value Vr1' of the tenth recording layer 144 and each of the command value Vr2' to the command value Vrn acquired at the other arbitrary positions P2 to Pn.

It should be noted that the degree of warpage ΔVgn' at each position Pn can be obtained from the following expression:

$$\Delta Vgn' = Vgn' - Vg1'$$

Further, the degree of warpage ΔVr' at each position Pn can be obtained from the following expression:

$$\Delta Vrn' = Vrn' - Vr1'$$

Similarly, the function (3) is a function of obtaining a degree of warpage Vgn of the second guide layer 122 and a degree of warpage ΔVrn of the tenth recording layer from the command value Vg1 to the command value Vgn of the second guide layer 122 and the command value Vr1 to the command value Vrn of the tenth recording layer 140 in recording of the track information at the time of deriving the track information 150.

In addition, here, as to the differences between the command value Vgn and the command value Vgn', between the command value Vrn and the command value Vrn', between the degree of warpage ΔVg and the degree of warpage ΔVg', between the degree of warpage ΔVrn and the degree of warpage ΔVrn', and the like, the former represents each value at the time of recording the track information 150 in any layer in the recording layer group 112 of the multilayer optical recording medium 100, and the latter represents each value derived from the multilayer optical recording medium 100 having the track information 150 recorded in any layer in the recording layer group 112, respectively.

The function (4) obtains the degree of warpage ΔVgn' and the degree of warpage ΔVrn' at the arbitrary position Pn from the track information 150 recorded in the multilayer optical recording medium 100 by the function (1) and the command value Vgn' and the command value Vrn' at the arbitrary position Pn in the multilayer optical recording medium 100 newly acquired by the function (2) and the function (3). This is a function of obtaining a degree of warpage dVgn of the second guide layer 122 and a degree of warpage dVrn of the tenth recording layer 140 due to age deterioration from the newly obtained the degree of warpage ΔVgn' and the degree of warpage ΔVrn' and the degree of warpage ΔVgn and the degree of warpage ΔVrn obtained from the track information 150.

It should be noted that the degree of warpage dVgn of the second guide layer 122 due to age deterioration can be obtained from the following expression:

$$dVgn = \Delta Vgn' - \Delta Vgn$$

Furthermore, the degree of warpage dVrn of the tenth recording layer due to age deterioration can be obtained from the following expression:

$$dVgn = \Delta Vgn' - \Delta Vgn$$

the degree of warpage dVgn and the degree of warpage dVrn are variations of the degree of warpage of the second guide layer 122 and the tenth recording layer caused by age deterioration.

Moreover, the function (4) is a function of determining whether each of the obtained the degree of warpage dVgn and the degree of warpage dVrn caused by age deterioration is a degree of warpage that can maintain the function of the multilayer optical recording medium 100 from the threshold value D of the degree of warpage that can maintain the function stored in the memory unit 67a.

(Recording Method of Track Information 150)

A description will now be given as to a method for recording the track information 150 in the tenth recording layer 140 in the recording layer group 112 of the multilayer recording medium 100, which is the function (1), with reference to a flowchart of FIG. 5.

First, when the arbitrary positions P1 to Pn at which the track information 150 of the multilayer optical recording medium 100 is recorded, for example, the position P1 to the position P3 are set in response to an instruction from the outside or the like (step ST11), the main control unit 67 rotates the multilayer optical recording medium 100 by the spindle device 3. Further, the main control unit 67 controls the feed motor control unit 62 to the position P1 provided on the innermost side of the multilayer optical recording medium 100 and moves the objective lens 34 to the arbitrary position P1 (step ST12).

The main control unit 67 performs focusing control (step ST13) and tracking control (step ST14) of the objective lens 34 after the objective lens 34 is moved to the arbitrary position P1. Specifically, the main control unit 67 controls the first control unit 71, the second control unit 72, and the guide layer light source 37, drives the objective lens 34, and allows the laser beam 98 to follow, for example, the second guide layer 122 in the guide layer group 111.

Subsequently, the main control unit 67 controls the fourth control unit 74 based on a light receiving signal of the laser beam 98 reflected on the second guide layer 122 and carries out the tracking control of the guide layer lens 44. The main control unit 67 derives a position of the guide layer lens 44 where the laser beam 98 reflected on the second guide layer 122 becomes maximum by controlling the fourth control portion 74, and derives the command value Vg1 that maximizes the laser beam 98 in the tracking control at the arbitrary position P1 (step ST15).

Then, as shown in FIG. 3, the main control unit 67 derives the sign Cg representing a position of a track in a predetermined region 200 at the arbitrary position P1 (step ST16).

Subsequently, the main control unit 67 controls the sixth control unit 80 based on a light receiving signal of the laser beam 99 reflected on the tenth recording layer 144 and performs the tracking control of the recording layer lens 54. The main control unit 67 derives a position of the recording layer lens 54 where the laser beam 99 reflected from the tenth recording layer 140 becomes maximum by controlling the sixth control unit 80 and derives the command value Vr1 that maximizes the laser beam 99 at the arbitrary position P1 in the tracking control (step ST17).

Then, the main control unit 67 derives the uniquely derived sign Cr1 of the tenth recording layer 140 from the signs Cg of the second guide layer 122 in the predetermined region 200 of the position P1 stored in the memory unit 67a (step ST18).

It should be noted that the sign Cr1 is, for example, an integer corresponding to a track of each sign Cg. For example, as shown in FIG. 3, when the signs Cg in the predetermined range of the arbitrary position P0 are 21 to 27, 1 to 7 each of which is an integer of the first digit of each sign Cg are derived as the sign Cr1.

Then, the main control unit 67 records the command value Vg1 of the second guide layer 122 obtained at the arbitrary position P1 and the command value Vr1 and the sign Cr1 of the 10th recording layer 140 in a predetermined region in the 10th recording layer 140 at the arbitrary position P1 (step ST19). As a result of these steps, the first track information 151 is recorded at the arbitrary position P1.

Then, the main control unit 67 determines whether the track information 150 has been recorded at all the positions P1 to P3 (step ST20). When the track information 150 has not been recorded at all positions P1 to P3 (NO in step ST20), the processing returns to the step ST12, and the main control unit 67 moves the objective lens 34 to the next arbitrary position Pn and then repeats the processing at the step ST13 or subsequent steps. For example, when the track information 150 has not been recorded at the position P1 to the position P3 and the first track information 151 has been recorded at the position P1, the main control unit 67 moves the objective lens 34 to the subsequent arbitrary position P2 (step ST12) and carries out the processing at the step ST13 and subsequent steps.

When the track information 150 has been recorded at all of the position P1 to the position P3 (YES in step ST20), the main control unit 67 terminates the recording of the track information 150. In this manner, the track information 150 is recorded at the position P1 to the position P3 set in the multilayer optical recording medium 100.

It should be noted that the degree of warpage $\Delta Vg$ of the second guide layer 122 and the degree of warpage $\Delta Vr$ of the tenth recording layer 140 in the multilayer optical recording medium 100 at the time of recording the track information 150 are obtained from the command value Vg1 to the command value Vgn, and the command value Vr1 to the command value Vgrn acquired by this recording method and the function (3) of the main control unit 67. The main control unit 67 may record the amounts of warp $\Delta Vg$ and $\Delta Vr$ in the tenth recording layer 140 together with the track information 150.

(Detection Method of Degree of warpage of Multilayer Optical Recording Medium 100)

A description will now be given as to a detection method for a degree of warpage of the multilayer optical recording medium 100 caused by age deterioration, i.e., the degree of warpage dVgn of the second guide layer 122 and the degree of warpage dVrn of the tenth recording layer 140, which corresponds to the function (2) and the function (4), with reference to a flowchart of FIG. 6.

First, the main control unit 67 rotates the multilayer optical recording medium 100 supported by the disk clamp 11. Then, the main control unit 67 derives the position P1 to the position Pn, which are the position P1 to the position P3 in this example, as detecting positions where the track information 150 of the multilayer optical recording medium 100 is recorded from the track information 150 recorded in the tenth recording layer 140 in the recording layer group 112 of the multilayer optical recording medium 100 (step ST31).

Subsequently, the main control unit 67 controls the feed motor control unit 62 and adjusts the objective lens 34 to face the position P1 provided on the innermost side of the multilayer optical recording medium 100 (step ST32).

The main control unit 67 moves the objective lens 34 to the position P1 and then carries out focusing control (step ST33) and tracking control (step ST34) of the objective lens 34. Specifically, the main control unit 37 controls the first control unit 71 and the second control unit 72, drives the objective lens 34, and enables the laser beam 98 to follow a track associated with the sign Cg1, which is the target sign Cgn at this point in time, in the second guide layer 122.

Then, the main control unit 67 controls the fourth control unit 74 based on a light receiving signal of the laser beam 98 reflected on the second guide layer 122 and performs tracking control over the guide layer lens 44. The main control unit 67 derives a position of the guide layer lens 44 that maximizes the laser beam 98 reflected from the second guide layer 122 by controlling the fourth control unit 74 and derives the command value Vg1' which is the command value Vgn' that maximizes the laser beam 98 in the tracking control at the position P1 (step ST35).

As a result, it is possible to obtain the command value Vg1' of the second guide layer 122 which is a calibration value considering a tilt inclination of the disk clamp 11 at the position P1. Further, the main control unit 67 stores this command value Vg1' of the second guide layer 122 in the memory unit 67a.

Then, the main control unit 67 derives the sign Cg1 to which the number of racks in the predetermined region 200 of the position P1 is assigned and stores the derived sign in the memory unit 67a (step ST36).

Subsequently, the main control unit 67 checks the sign Cg1 and derives one sign associated with the sign Cg1 of the second guide layer 122 in the sign Cr1 recorded in the first track information 151 (step ST37). For example, when a sign used for obtaining the command value Vg1' in the signs Cg1 is 23, the main control unit 67 determines that the sign Cr1 associated with Cg1 is 3 and derives Cr1=3.

Then, with the use of any one of the derived signs Cr1, the main control unit 67 controls the sixth control unit 80 based on a light receiving signal of the laser beam 99 reflected from the tenth recording layer 140 and performs tracking control over the recording layer lens 54. The main control unit 67 controls the sixth control unit 80 and thereby derives the command value Vr1' which is the command value Vrn' in a state that the laser beam 99 is enabled to follow the track on which the sign Cr1 corresponding to the target sign Crn is recorded (step ST38).

As a result, it is possible to obtain, at the arbitrary position P1, the command value Vg1' of the second guide layer 122 and the command value Vr1' of the tenth recording layer 140 which are calibration values considering a tilt inclination of the disk clamp 11. The main control unit 67 stores the derived command value Vg1' of the second guide layer 122 and the derived command value Vr1' of the tenth recording layer 140 in the memory unit 67a.

It should be noted that, when the command value Vg of the second guide layer 122 and the command value Vr1' of the tenth recording layer 140 exceed allowable values, the main control unit 67 determines that an allowable optical axis deviation is exceeded because of function loss of the multilayer optical recording medium 100 or a failure of the drive device 1. It should be noted that a situation where the command value Vg of the second guide layer 122 and the command value Vr1' of the tenth recording layer 140 exceed the allowable values is, for example, a situation where one sign Cg1 and the sign Cr1 associated with the one sign Cg1 are followed and the reflected laser beams 98 and 99 cannot perform reading.

Then, the main control unit 67 determines whether the command values Vgn' of the second guide layer 122 (the command value Vg1' to the command value Vg3') and the command values Vrn' of the tenth recording layer 140 (the command value Vr1' to the command value Vr3') have been derived at all of the arbitrary positions P1 to P3 (step ST39). When the command values Vrn' and Vgn' have not been derived at all of the arbitrary positions P1 to P3 (NO in step ST39), the processing returns to the step ST32, the objective lens 34 is moved to the next arbitrary position P2, the processing at the step ST33 and subsequent steps is repeated, the command values Vg2' and the command values Vr2' are derived, and the processing is repeated until the command values Vgn' and the command values Vrn at the respective positions P2 to P1 are all derived.

When the command values Vg' of the second guide layer 122 and the command values Vr' of the tenth recording layer 140 have been derived at the arbitrary positions P1 to Pn (YES in step ST39), the main control unit 67 derives the degree of warpage ΔVg' and the degree of warpage ΔVr' of the multilayer optical recording medium 100 (step ST40).

Specifically, the main control unit 67 derives the degree of warpage ΔVg of the second guide layer 122 and the degree of warpage ΔVr of the tenth recording layer 144 in the multilayer optical recording medium 100 at the time of recording the track information 150 from the command value Vg1 to the command Vgn and the command value Vr1 to the command value Vrn recorded in the track information 150.

Further, the main control unit 67 also derives the degree of warpage ΔVg' of the second guide layer 122 and the degree of warpage ΔVr' of the tenth recording layer 140 in the multilayer optical recording medium 100 at the time of detecting the degrees of warpage in the track information 150 from the derived command values Vg1' to Vgn' and the derived command values Vgn' to Vr1'.

Then, the main control unit 67 derives the degree of warpage dVgn of the second guide layer 122 and the degree of warpage dVrn of the tenth recording layer 140 caused by age deterioration from the degree of warpage ΔVg of the second guide layer 122 and the degree of warpage ΔVrn of the tenth recording layer 140 recorded in the track information and the derived degree of warpage ΔVg' of the second guide layer 122 and the derived degree of warpage ΔVrn' of the tenth recording layer 140.

Subsequently, the main control unit 67 compares the threshold value D which is a degree of warpage that is stored in the memory unit 67a and enables maintaining the function of the multilayer optical recording medium 100 with each of the derived degree of warpage dVgn of the second guide layer 122 and the derived degree of warpage dVrn of the tenth recording layer 140 at each position Pn caused by age deterioration (step ST41).

When the degree of warpage dVn of the second guide layer 122 and the degree of warpage dVr of the tenth recording layer 140 at each position Pn are all within the range of the threshold value D for the degrees of warpage (YES in step ST41), the main control unit 67 determines that the warp (degree of warpage) of the multilayer optical recording layer 100 caused by age deterioration falls within the allowable range that enables maintaining the function of the multilayer optical recording medium 100 (step ST42).

When at least one of the degree of warpage dVgn of the second guide layer 122 and the degree of warpage dVrn of the tenth recording layer 140 exceeds the threshold value D for the degrees of warpage (NO in step ST41), the main control unit 67 determines that the degree of warpage of the multilayer optical recording medium 100 exceeds the allowable range and the multilayer optical recording medium 100 is unusable (step ST43). It should be noted that the main control unit 67 informs, for example, a system or a display unit different from the drive device 1 connected to the main control unit 67 of a result of the determination on each degree of warpage of the multilayer optical recording medium 100, thereby giving this information to a user.

Based on such processing, the degree of warpage dVgn of the second guide layer 122 and the degree of warpage dVrn of the tenth recording layer 140 in the multilayer optical recording medium 100 caused by age deterioration are detected, and whether the multilayer optical recording medium 100 can be used is determined.

According to the multilayer optical recording medium 100 and the drive device 1 having such a configuration, it is possible to derive an amount of physical warp of the multilayer optical recording medium 100 before or after aged deterioration in accordance with the track information 150 recorded in any recording layer in the recording layer group 112 at each of arbitrary positions P1 to Pn in the multilayer optical recording medium 100.

Furthermore, according to the multilayer optical recording medium 100, an amount of physical warp thereof can be detected by the drive device 1 from information of the guide layer group 111 and the recording layer group 112 provided in the multilayer optical recording medium 100 without additionally measuring this degree of warpage by using an inspection device or the like. Therefore, for example, the degree of warpage can be detected by the drive device 1 that performs recording and reproduction of the multilayer optical recording medium 100 without additionally using a device that can detect the degree of warpage, thereby improving usability.

As described above, according to the multilayer optical recording medium 100, the drive device 1, and the inspection method for a degree of warpage of the multilayer optical recording medium 100 of this embodiment, the degree of warpage of the multilayer optical recording medium 100 can be detected.

It should be noted that the multilayer optical recording medium 100, the drive device 1, the inspection method for a degree of warpage of the multilayer optical recording medium 100 of this embodiment are not restricted to the above-described configuration. For example, the description has been given as to the configuration where the track information 150 is recorded in the multilayer optical recording medium 100 by the drive device 1 and then a degree of warpage of the multilayer optical recording medium 100 is derived in the above instance, but the present embodiment is not restricted thereto.

For example, at the time of manufacturing the multilayer optical recording medium 100, the track information 150 may be recorded in advance, and detection of a degree of warpage alone may be performed in the drive device 1. When the thus configured multilayer optical recording medium 100 is adopted, a degree of warpage caused since the manufacture can be detected. Moreover, the drive device 1 may be configured to have the reproducing function alone without having the recordable function, and even the drive device 1 having the reproducing function alone can detect a degree of warpage of the multilayer optical recording medium 100. Additionally, the drive device 1 may be configured have only the function that enables recording the track information 150 without having the reproducing function.

Further, in the above example, the description has been given as to the configuration where the degree of warpage dVgn of the second guide layer 122 and the degree of warpage dVrn of the tenth recording layer 140 which are variations of a degree of warpage caused by age deterioration are obtained, each of degree of warpage dVgn and degree of warpage dVrn is compared with the threshold value D, and whether the warpage of the multilayer optical recording medium 100 caused by age deterioration is allowable is determined, but the present embodiment is not restricted thereto.

For example, each of the degree of warpage ΔVg' of the second guide layer 122 and the degree of warpage ΔVr' of the tenth recording layer 140 derived by the drive device 1 may be compared with the threshold value D. Furthermore, each of the command value Vg1' to the command value Vgn' of the second guide layer 122 and the command value Vr1' to the command value Vrn' of the tenth recording layer 140 may be compared with the threshold value D.

Moreover, in the above example, the configuration where the threshold value D is provided in the memory unit 67a has been described, but the present embodiment is not restricted thereto.

For example, at the time of manufacture of the multilayer optical recording medium 100, information may be recorded at a predetermined position in any guide layer in the guide layer group 111 in advance, and the information may be read out when warp detection begins. When the thus configured multilayer optical recording medium 100 is adopted, a threshold value for an allowable degree of warpage can be individually set in accordance with, for example, a material of the multilayer optical recording medium 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A drive device comprising:
a spindle device which rotates a multilayer optical recording medium having: a guide layer group that is provided on a substrate and has guide layers having positional information in a radial direction recorded therein; and recording layers that are provided on the substrate and configured to record information therein;
an optical device which comprises: an objective lens that faces the multilayer optical recording medium rotated by the spindle device; driving means for driving the objective lens to an arbitrary position in the radial direction; a supply source that emits laser beams having different wavelengths which are supplied to the guide layers and the recording layers, respectively; a light receiving element that receives the laser beams reflected by the guide layers and the recording layers; and a lens device that guides the laser beams to the objective lens and the light receiving element and is configured to perform focusing and tracking of the laser beams; and
a control device which is configured to reproduce information recorded in the guide layers and the recording layers by using reflected lights of the laser beams applied to the guide layers and the recording layers when the recording layers are irradiated with the laser beams by the optical device, reproduces the positional information stored in the guide layers, and derives positional information of the recording layers associated with the positional information recorded in the guide layers at the positions of the recording layers in the radial direction and control information of the optical device that maximizes reflected light volumes of the laser beams of the guide layers and the recording layers at the positions;
wherein the control device derives a degree of warpage of the multilayer optical recording medium from a difference between the derived pieces of control information at the positions in the radial direction;

wherein the control device comprises a memory unit which stores a threshold value of the degree of warpage for reproduction and recording in the multilayer optical recording medium; and the control unit compares the derived degree of warpage with the threshold value, and determines that the degree of warpage of the multilayer optical recording medium is a degree of warpage that allows reproduction and recording in the multilayer optical recording medium when the degree of warpage falls within a range of the threshold value.

2. The device according to claim 1, wherein the control device is configured to record information in the recording layers by irradiating the recording layers with the laser beams with the use of the optical device, and the control device records the derived positional information and control information of the recording layers at the positions in the radial direction of the recording layers by using the optical device.

3. The device according to claim 2, wherein the control device derives the degree of warpage of the multilayer optical recording medium from a difference between the pieces of control information recorded in the recording layers.

4. The drive device according to claim 3, wherein the control device derives the control information of the optical device that maximizes the reflected light volumes of the laser beams in the guide layers at the positions at the time of reproducing the positional information recorded in the guide layers and the recording layers, the control device derives the degree of warpage of the multilayer optical recording medium from a difference between the pieces of control information derived at the time of reproducing the positional information, and the control device derives a variation of the degree of warpage from the degree of warpage of the multilayer optical recording medium derived from a difference between the pieces of control information recorded in the recording layers and the degree of warpage of the multilayer optical recording medium derived at the time of reproducing the positional information.

5. The device according to claim 4, comprising a memory unit which stores a threshold value of the degree of warpage that enables reproduction and recording in the multilayer optical recording medium, and the control unit compares the derived variation of the degree of warpage with the threshold value, and determines that the reproduction and the recording in the multilayer optical recording medium are possible when the variation of the degree of warpage falls within a range of the threshold value.

6. A reproducing and recording apparatus comprising the drive device of claim 1.

7. An inspection method of a multilayer optical recording medium, comprising:

rotating a multilayer optical recording medium by a spindle device, the multilayer optical recording medium comprising: a guide layer group that is provided on a substrate and has guide layers that are configured to record positional information in a radial direction therein and allow the recorded positional information to be reproduced by reflecting a laser beam emitted from an optical device; and a recording layer group which is provided on the substrate, has recording layers configured to record information therein, and has positional information of the recording layers associated with the positional information in the radial direction recorded in the guide layers and control information of the optical device that maximizes reflected light volumes of the laser beams on the guide layers and the recording layers at positions in the radial direction which are recorded at positions on the recording layers in the radial direction;

rotating the multilayer optical recording medium by the spindle device, the multilayer optical recording medium having: a guide layer group which is provided on the substrate and has guide layers that are configured to record positional information in a radial direction therein, and allow the recorded positional information to be reproduced by reflecting a laser beam emitted from an optical device; and recording layers that are provided on the substrate and configured to record information therein;

reproducing the positional information by a reflected light of the laser beam applied to the recording layers with the use of the optical device;

deriving positional information of the recording layers associated with the positional information recorded in the guide layers at the positions in the radial direction of the recording layers and control information of the optical device that maximizes reflected light volumes of the laser beam on the guide layer at the positions; and deriving a degree of warpage of the multilayer optical recording medium from a difference between the derived pieces of control information at the positions, comparing a variation of the derived degree of warpage with a threshold value which is provided a memory unit, by a control device, the control device comprising the memory unit which stores a threshold value of a degree of warpage that enables reproduction and recording in the multilayer optical recording medium is provided, and determining that the reproduction and the recording in the multilayer optical recording medium are possible when the variation of the degree of warpage falls within a range of the threshold value, by the control device.

* * * * *